J. A. BOSTWICK.
SOLDERING IRON.

No. 104,412.  Patented June 21, 1870.

Witnesses
H. H. Young
Harry Coleman

Jabez A. Bostwick, Inventor
By David A. Burr, Atty.

United States Patent Office.

JABEZ A. BOSTWICK, OF NEW YORK, N. Y.

Letters Patent No. 104,412, dated June 21, 1870.

IMPROVEMENT IN SOLDERING-IRON.

The Schedule referred to in these Letters Patent and making part of the same.

I, JABEZ A. BOSTWICK, of the city, county, and State of New York, have invented a new and useful Soldering-Iron for Soldering Metallic Caps, or other projecting pieces, on Metallic Vessels, of which the following is a specification.

My invention relates to the construction and use of a hollow soldering-iron for soldering metallic caps, or other projecting pieces, upon metallic oil-cans or other vessels, said iron, when made with an inclosing edge of the dimensions and form of the rim or edge of the cap or piece to be soldered, so as to conform thereto when placed thereon, and so extended and formed interiorly as to receive and embrace loosely a guiding-rod to be placed upon the cap to be soldered, to hold the latter down firmly until it has been secured by the solder, and at the same time guide the iron to its proper place upon or against the rim or edge of the cap.

Figure 3 is a sectional view of the soldering-iron placed upon the cap, so as to solder the same, with its guiding-iron in place to hold it down and guide the iron in its operation.

Figure 1:
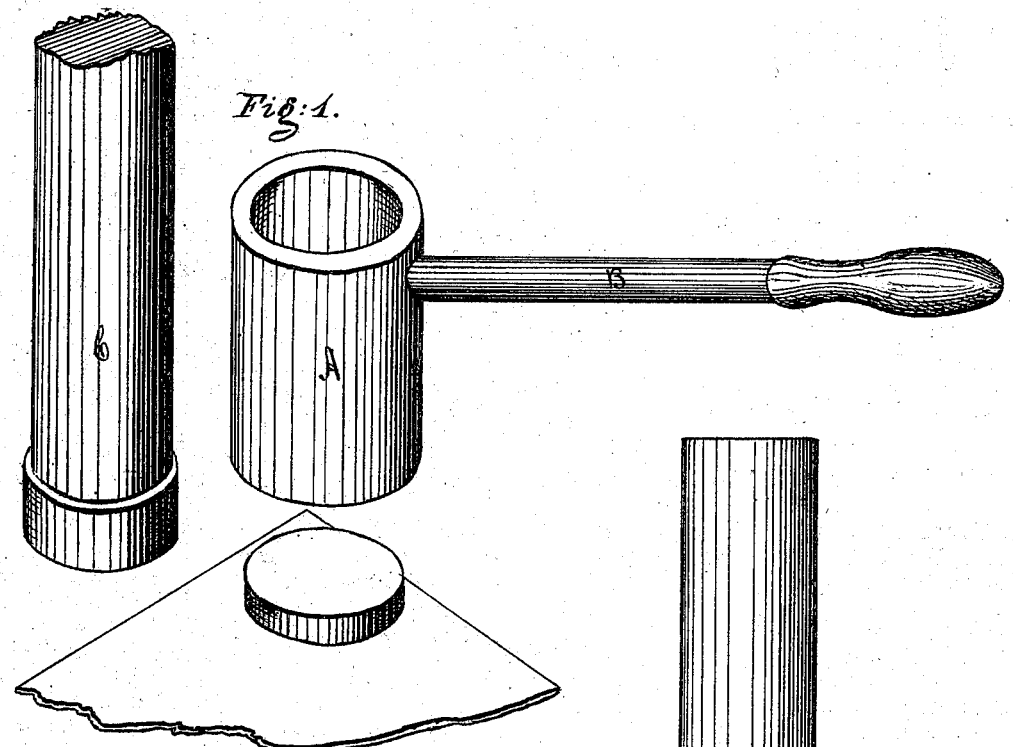
Figure 1 is a view in perspective of my improved soldering-iron, and of a cap placed upon a metallic can to be soldered.
Figure 2:
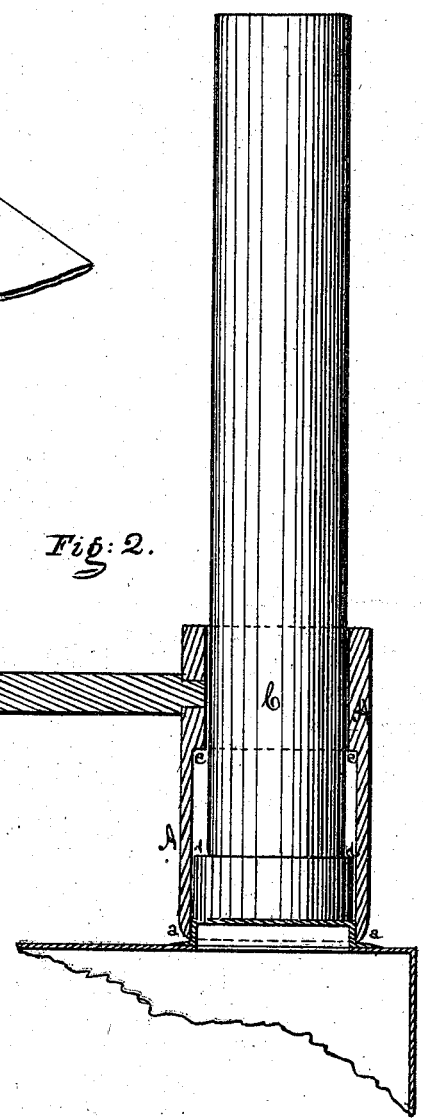
Figure 2 is an elevation of the guiding-rod.

A is my improved soldering-iron, made of a cylindrical form, to solder circular caps, &c. It consists of a cylinder of metal made thick to retain heat, and hollow to fit over and inclose the projection of the metallic cap to be soldered thereby, its inner diameter at its lower end being somewhat greater than the external diameter of said cap.

It is provided with a handle, B, secured thereto near its upper end, guarded, as usual, with wood or other non-conductor of heat.

Its lower rim, $a\ a$, is beveled, so as to present a narrow edge to hold the solder in applying the same to the joint.

The inner diameter of its upper end is made smaller than that of its lower end, so as to form a shoulder, $e$, therein about midway of its length.

C is a rod, whose lower end is of a diameter about equal to that of the cap or projection to be soldered, but which is reduced in diameter above the same, so as to form a projecting offset or shoulder, $d$, a counterpart of that ($e$) within the soldering-iron.

After the iron has been properly heated, it is slipped over this rod, and the rod, being then placed upon the cap, is held thereon firmly while the lower rim of the heated iron, duly supplied with solder, bearing upon the joint of the cap with the vessel, will instantly solder and secure the same about its entire circumference.

By lifting the rod, its shoulder, engaging with the offset within the iron, will take up the latter with it in readiness to be placed upon another cap, and thus a number of caps may be quickly and thoroughly soldered at one heat of the iron.

I contemplate making the soldering-iron A and its guiding-rod C of any form in transverse section which may be required, to cause it to fit upon any form of cap or other projection, whether round, square, oval, or of any other curved or polygonal shape. Its lower rim or edge need not be made continuous, but may be broken or slotted.

I claim as my invention—

The hollow soldering-iron A, having a handle, B, and beveled rim $a\ a$, in combination with the rod C, substantially as herein described and set forth.

J. A. BOSTWICK.

Witnesses:
CHAS. W. JONES,
W. H. TILFORD.